United States Patent [19]

Berg

[11] Patent Number: 5,513,739
[45] Date of Patent: May 7, 1996

[54] METHOD AND APPARATUS FOR FEEDING OBJECTS INTO A PREDETERMINED HANDLING POSITION

[75] Inventor: Magnus Berg, Norsborg, Sweden

[73] Assignee: IPS Mechatronics AB, Norsborg, Sweden

[21] Appl. No.: 202,230

[22] Filed: Feb. 25, 1994

[30] Foreign Application Priority Data

Feb. 26, 1993 [SE] Sweden .................................. 9300643

[51] Int. Cl.⁶ ................................................. B65G 47/24
[52] U.S. Cl. .......................... 198/380; 198/390; 414/224
[58] Field of Search ............................. 414/224; 198/390, 198/380

[56] References Cited

U.S. PATENT DOCUMENTS

| | | | |
|---|---|---|---|
| 3,563,361 | 2/1971 | Piroutek | 198/390 |
| 3,893,691 | 7/1975 | Kearney et al. | |
| 4,801,044 | 1/1989 | Kubota et al. | |
| 4,846,345 | 7/1989 | Hamuro et al. | |
| 5,070,988 | 12/1991 | Konishi et al. | |
| 5,101,955 | 4/1992 | Masterton | 198/390 |

FOREIGN PATENT DOCUMENTS 363078  1/1974  Sweden .

*Primary Examiner*—Donald W. Underwood
*Attorney, Agent, or Firm*—Larson and Taylor

[57] ABSTRACT

A method is provided for feeding objects (15) from a magazine (11, 14) having a set of objects (12, 15) therein, through a feeder path (4) to a correct "catch position" (6) in which the objects (15) are placed in a predetermined correct alignment. One or more objects (15) at a time are let down through a feeding assembly (14, 16) to a feeder path (4) and are brought to pass a barrier (17) of mechanical or other type which is mounted interiorly of a passageway (4a) of the feeder path (4). The feeder passageway (4a) has a cross sectional shape and a cross sectional size which substantially coincides with the cross sectional shape and cross sectional size of the object. An object (15) having the correct positioning will be let down into the passageway (4a) of the feeder path (4), whereas objects (15), at the inlet of the feeder path (4) including the barrier (17), which have an incorrect positioning, e.g., which are positioned obliquely, are lying on their side or are turned upside down, are temporarily lifted off, preferably using blasts of compressed air, to make a place for correctly positioned objects.

18 Claims, 4 Drawing Sheets

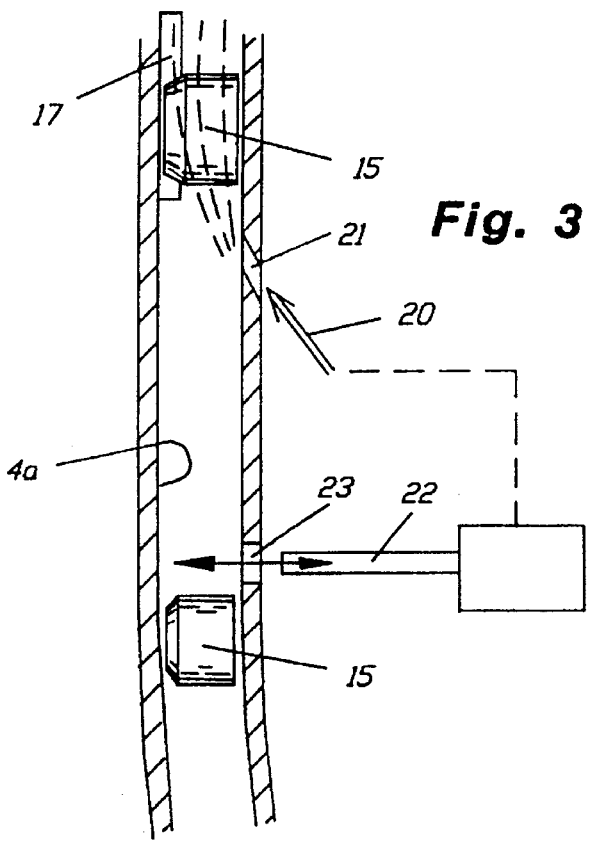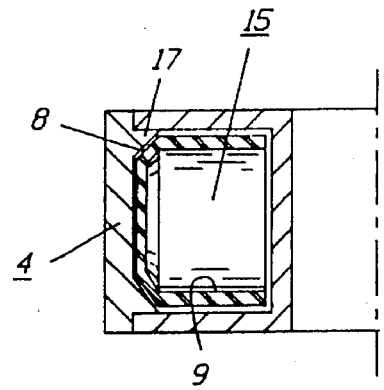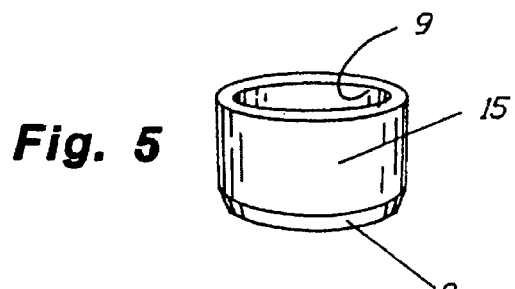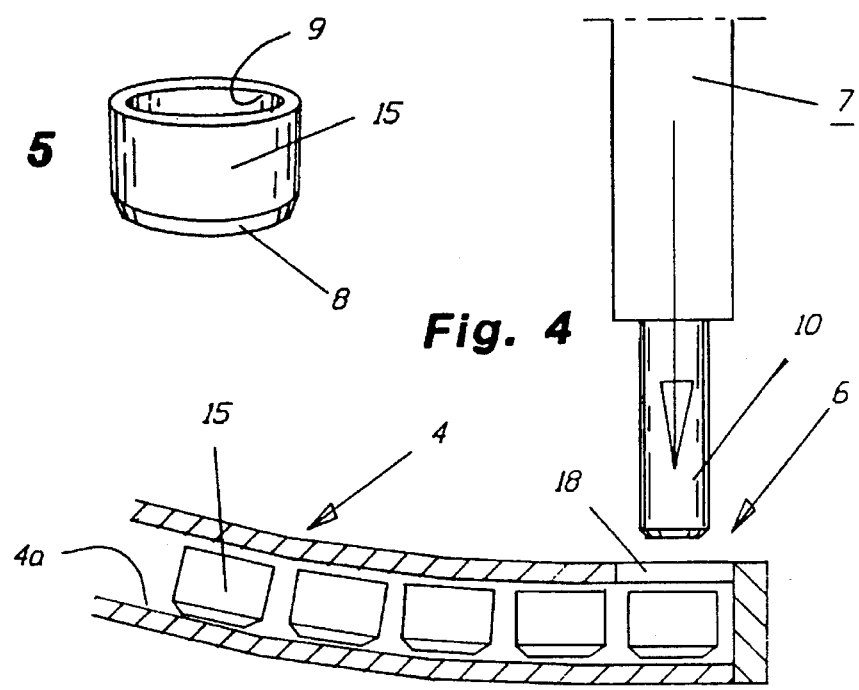
Fig. 3
Fig. 2
Fig. 5
Fig. 4

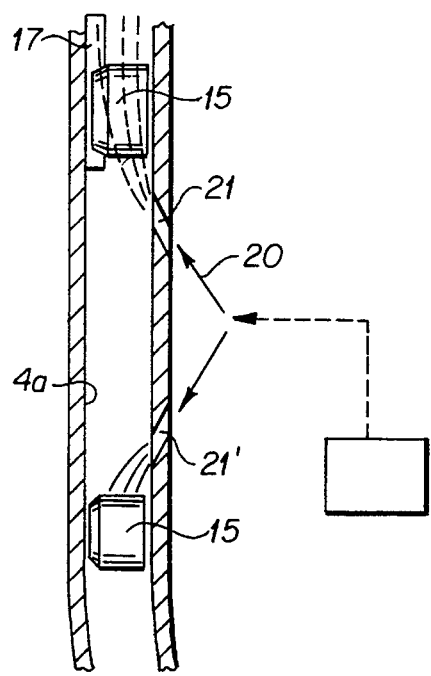
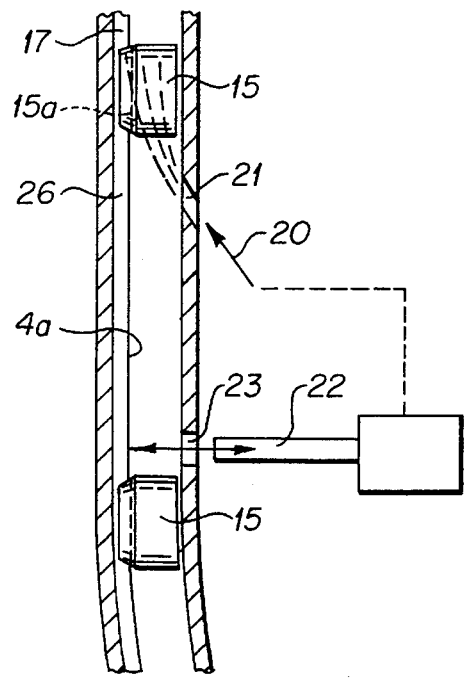
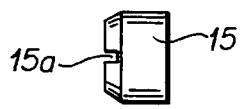
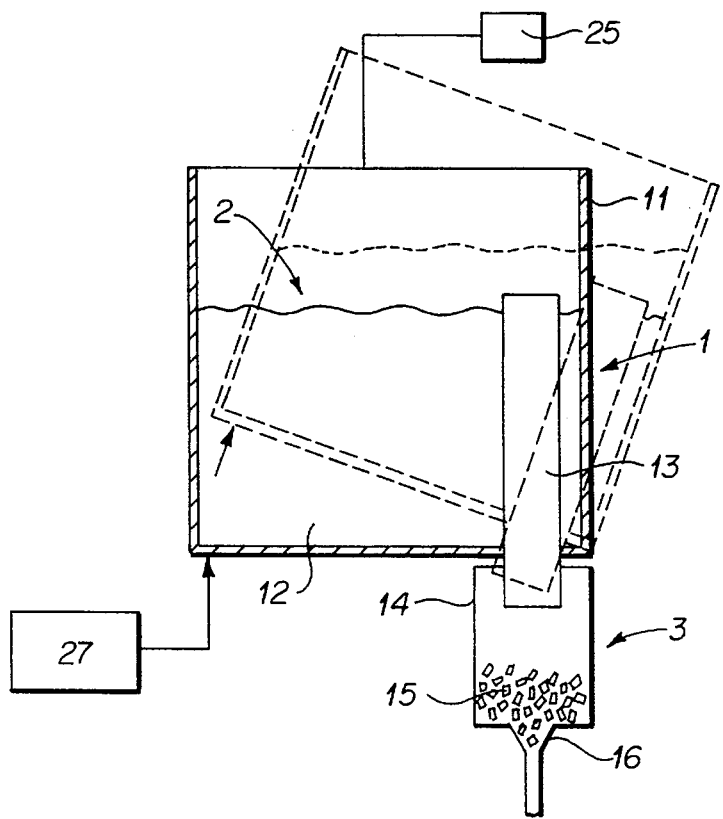
Fig. 8
Fig. 9a
Fig. 9b
Fig. 10

METHOD AND APPARATUS FOR FEEDING OBJECTS INTO A PREDETERMINED HANDLING POSITION

The present invention relates to a method and an apparatus for feeding objects from a magazine into a predetermined position spaced from the magazine, whereby said objects are placed in a predetermined positioning or alignment in said predetermined position.

By "objects" is meant, in this connection, any type of objects having a fully or partly un-symmetrical shape, for instance objects which are symmetrical about a certain axis, like rotational symmetrical objects, but which objects are un-symmetrical about another axis, and whereby each such object may be positioned in several various positions, for instance may lie down or may become standing in two or more different positions, only one position of which, or in some cases perhaps two or more such positions, is a correct positioning for the subsequent handling of the object in question.

As an example of objects which can be handled according to the invention may be mentioned stoppers or plugs having a certain bottom shape and differing top shape, or screws without a head and having, for instance, a tapering end surface and having a screw slot at the opposite end surface, or insex screws without a head, nuts the cross ends of which have different shapes, pointed screws etc. having insex cavities, and many other objects.

The invention has been develloped as the solution of the aim to create a machine for filling and closing of cans, bottles, dispensing tubes, ampullas and similar objects, whereby the can or the similar object, after it has been filled, is to be sealed by a machine using a closing plug, which plug is picked up or caught by a handling arm from a certain "catch position", in which the plug is kept with a part thereof, which can be seized by the handling arm, facing said handling arm. Such part which can be engaged by the handling arm may e.g. be a cavity in case the plug is cup-formed, or any other part which can be seized by the handling arm. The plug thereby is presented ready for receiving said handling arm in its catch cavity. The handling arm lifts the plug from the "catch position" and moves same to a position in which the plug is pressed down into an open end of the can, of the container, of the sleeve or of a similar object thereby closing said object.

In the following the invention will mainly be illustrated and described in such an application, but it is obvious that the invention can be utilized within many other tehcnical fields and for handling of many other types of objects which are at least partly un-symmetrical.

In a machine for closing of cans, containers and similar receptacles by means of a plug, for instance a cylindrical, cup-shaped plug as mentioned above, there has so far generally used a vibratory feeder for feeding plugs by a vibratory movement from a magazine and into a position in which the plugs can be seized by the handling arm, For making it possible to press the plugs down in to the mouth of the can, which is to be closed, the plugs have, in this case, been formed with a bevelled or slightly truncated conical point.

In the vibratory feeder such plugs may take at least three different positions, namely a correct position with the seizable part of the plug, e.g. the cavity, turned upwards facing the handling arm, a position turned upside down with the cavity turned oppositely from the catching arm, and one or more incorrect positions in which the plugs are lying down on their sides. In the last mentioned two cases it is necessary, by any suitable method, to remove the plug or to rotate the plug so that it takes a correct position. Generally the plug is, however, removed from the feeder and a correctly positioned plug enters the feeder instead thereof. Thus, only a minor portion of the plugs take a correct position for being handled. As a consequence the vibratory feeders are relatively slow, and they can reduce the overall capacity of the machine. Generally the vibratory feeders also are rather expensive to manufacture.

The object of the invention therefore has been to solve the problem of quickly, safely, effectively and by a non-expensive method provide a feeding of objects into a correct "catch position" with the objects in question positioned or aligned in a predetermined correct position, supposing said objects are at least partly un-symmetrical so that it is possible, by using a machine, to guarantee that the objects direct themselves into a correct alignment in the said "catch position" of the plugs.

According to the invention one plug at a time is let down through a feeder path and is brought to pass a mechanical barrier the cross section shape and cross section size of which, in common with the feeder path in which said path is arranged, substantially coincides with the cross section shape and cross section size of the object when said object is in a correct feeding position said feeder path. Such objects which at the inlet or entrance of the feeder path having said mechanical barrier happen to take an incorrect position, for instance an oblique position, are lying on their side or are turned upside down, are temporarily removed for providing a space for correctly positioned objects. The removal preferably is made by means of compressed air jets directed upwards and also directed slightly downwards. At the same time as the incorrectly positioned objects are blown off the inlet of the feeder path the jets of compressed air used for this purpose provide a kind or stirring and aeration of the objects existing in the magazine, and the air jets also act for pressing down objects appearing further down in the feeder path. The objects which fall down in the feeder path in correct positions slide down along the feeder path, past the barrier, and are stopped in a correct "catch position" for the handling In an apparatus for executing the method according to the invention the feeder path may be straight or may be bow-formed, and the feeder path is, at or close to the inlet thereof, formed with a mechanical, or another type of barrier which stops objects which are obliquely placed, which lie on their sides or which are turned upside down.

For preventing the correctly positioned object or objects, which have already been fed down in the feeder path, from being pressed or sucked back and out of the feeder path when upwardly directed jets of compressed air are introduced in the feeder path for blowing incorrectly positioned objects away from the inlet of the feeder path, and for stirring objects in the magazine, respectively, said feeder path may also be formed any type of locking means, for instance a locking arm which can be introduced in the feeder path in a position underneath the mechanical barrier, or said locking means may be a blower means providing downwardly directed air jets introduced at the same place, or at a similar place, and which thereby act as a stop lid above the objects which have already been let down in the feeder path. This also eliminates, or at least reduces, the suction action appearing when the compressed air jets are introduced in the feeder path. The upwardly directed compressed air jets likewise provide a certain downwardly directed movement or air which contributes to providing a pressing down correctly positioned objects in the feeder path, which objects already exist in the feeder path.

Further characteristics of the invention and advantages thereof will be evident from the following detailed specification in which reference will be made to the accompanying drawings. In the drawings FIG. 1 illustrates an apparatus according to the invention in a diagrammatical cross section view.

FIG. 2 shows a cross section along line II—II of FIG. 1.

FIG. 3 is an enlarged view of the part III of FIG. 1 encircled by dotted lines, and FIG. 4 shows, in the same scale, the part IV encircled with point-dotted lines in FIG. 1.

FIG. 5 shows in a prespective view, an example of an object suited for being handled by means of the illustrated apparatus.

FIG. 8 is a view similar to FIG. 3 illustrating an alternative embodiment.

FIG. 9a is also a view similar to FIG. 3 illustrating a further modification while FIG. 9b shows an object or unit used in this modification.

FIG. 10 is a view similar to FIG. 1 illustrating tilting of the main container.

Figure 1:
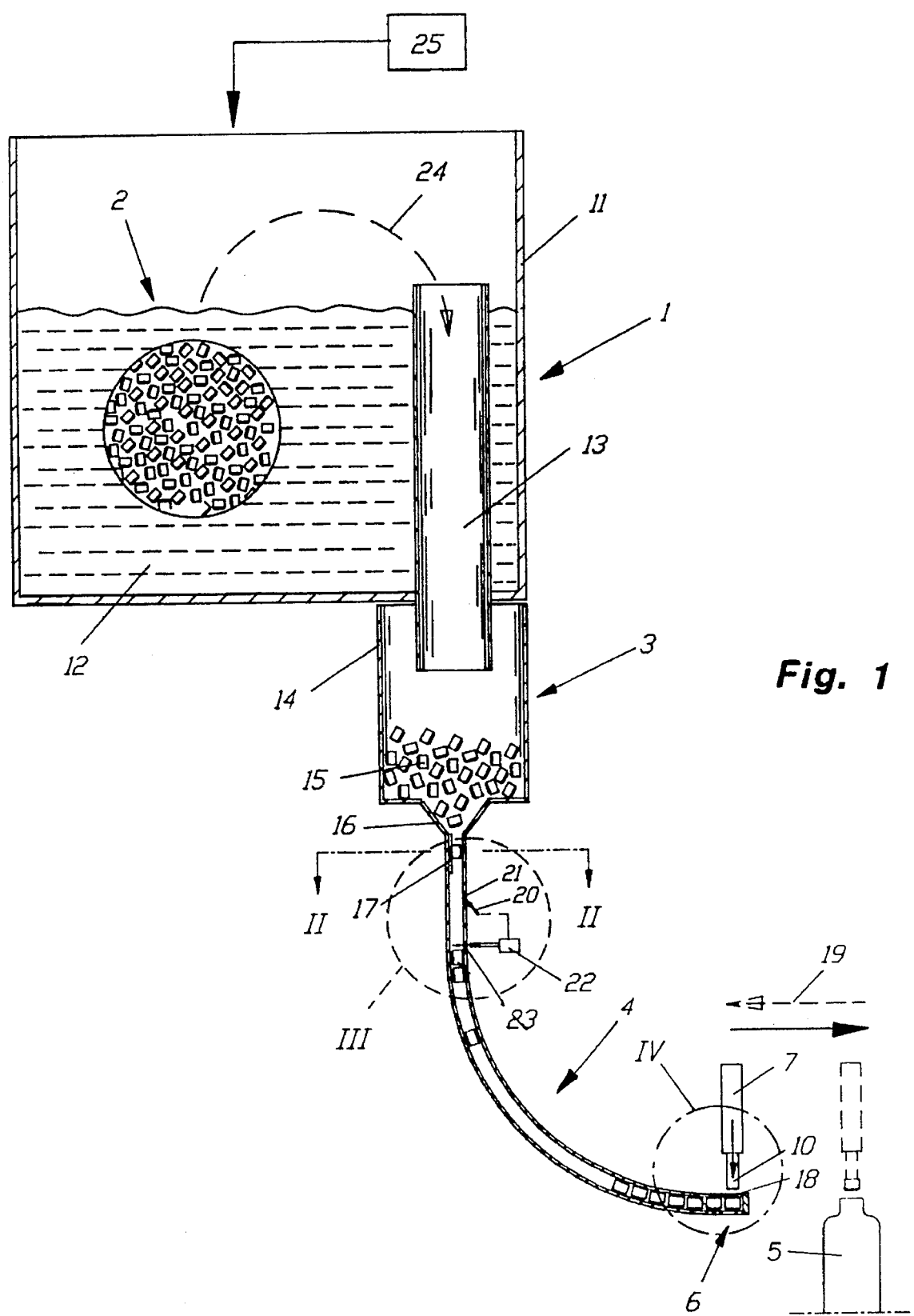
Figure 6:
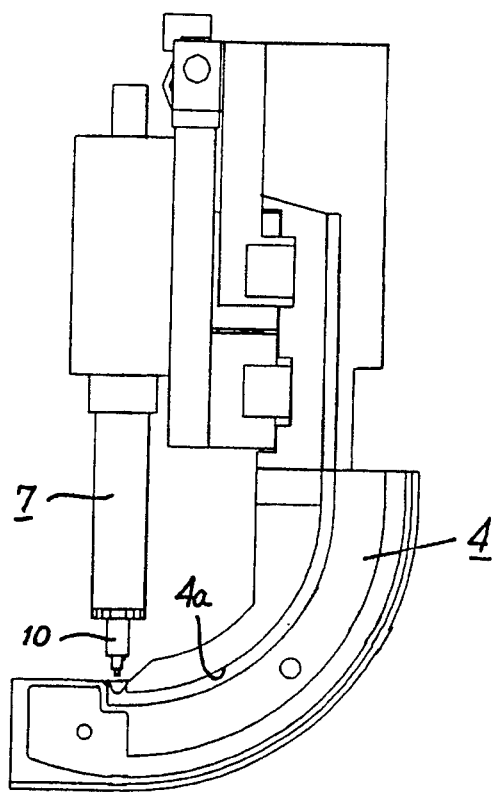
FIG. 6 shows a side view, in a vertical cross section, of a handling apparatus in a machine having a positioning unit according to the invention.
Figure 7:
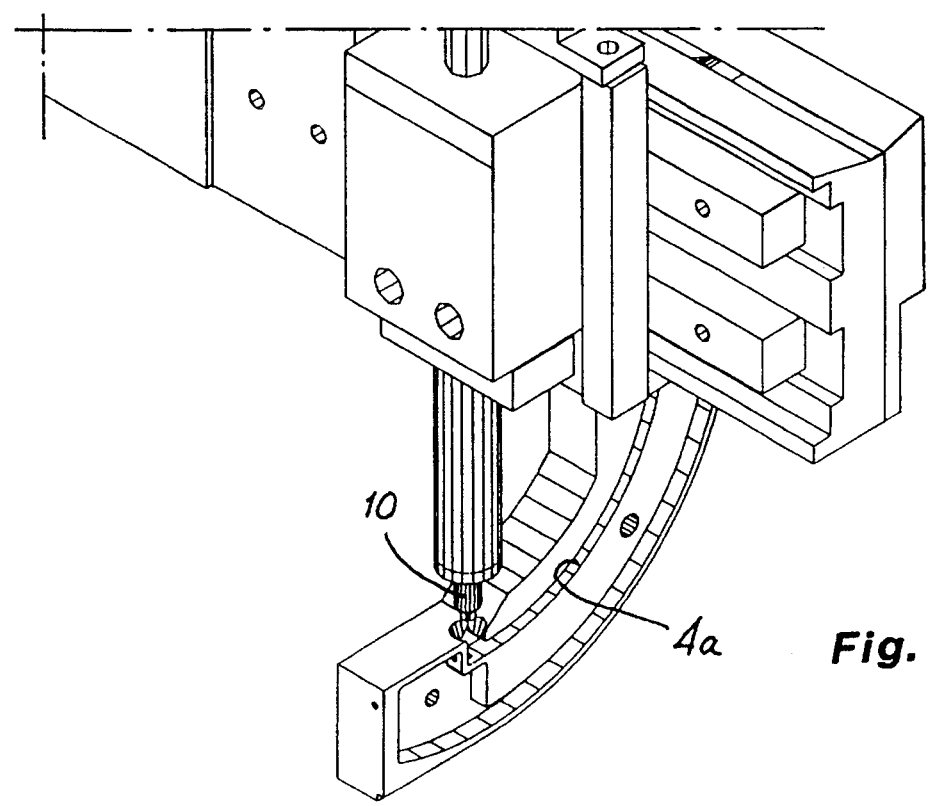
FIG. 7 is a perspective view of a part of the same apparatus as shown in FIG. 6.

The feeder apparatus shown in the drawings generally comprises a container magazine 1 for the objects 2 which are to be handled, a feeder funnel 3 and a feeder path 4 for the feeding objects.

In the illustrated case the feeding objects 2 is a type of plug intended to be used for closing the mouth of a container of any type, for instance some type of pot, bottle, ampulla 5 or a similar receptacle, as indicated in FIG. 1, but it is obvious that the feeding objects may be of many other types than those illustrated in the drawings. The only requirement of the objects is that they are at least partly un-symmetrical, so that the feeder apparatus by mechanical means can guarantee that the objects are accepted for being introduced in the feeder path only when the object has a predetermined positioning, whereupon such accepted objects move down to a "catch position" 6 of the feeder path, in which position a handling arm 7 can pick up one object at the time and transmit same to the final position, for instance as a plug of a bottle 5.

The plug 5, which is shown in a perspective view in FIG. 5, is bevelled, at edge 8, at the bottom thereof for making it possible to press the plug down in the mouth of the bottle. Said bevelled bottom edge 8 is also utilized for directing the plug so as to be presented in "correct" alignment in the "catch position" 6. In the illustrated case the plug 2 is cup-shaped, and the cup cavity 9 is used as an engagement means for the handling arm 7, which is formed with a catcher 10 that can be expelled thereby becoming engaged, by friction of otherwise, in the cup cavity 9 for lifting the plug out of the feeder path and for pressing the plug down in the mouth of the bottle 5.

The container or magazine 1 for the feeding objects can be of any optional type, but in the drawings the container is shown as a main container 11 comprising a large number of objects 12 existing in a complete disorder, as indicated in the encircled part defining a unit 2 of objects in FIG. 1. At a suitable place of bottom of the main container 11 there is a pipe 13 extending through the bottom thereof, which pipe projects upwards as far as to a slight distance above the unit 2 of objects, and the pipe extends downwards to a slight distance underneath the bottom of the container 11 and into the feeder funnel means 3. Said feeder funnel means 3 acts as a secondary magazine or container 14 for a relatively smaller and easily movable unit 15 of objects. The secondary container 14 is, at the bottom thereof, formed with a conical funnel 16, the outlet of which is connected to the feeder path 4 for feeding one or more objects at the time down to the "catch position" 6.

The objects, in the illustrated case the plugs 2, have a height which differs from the diameter thereof, and the diameter may for instance be greater than the height. The outlet of the funnel 16 at the feeder path has a rectangular cross section shape with a dimension which is slightly greater than the height and the diameter, respectively, of the plug. As a consequence the plugs can only be introduced into the feeder path lying on the side. In order to ensure that the plugs are also presented "correctly turned", whereby is meant that the cavity 9 of the plug is facing upwards towards the handling arm 7 when the plugs are in the "catch position" 6, the feeder path is, close the funnel 16, formed with a mechanical barrier means, i.e., barrier bars or ribs 17, which is most clearly shown in FIG. 2, and which is formed as a bottom piece of the feeder path. Said bottom piece is formed as two triangular ribs arranged at the two adjacent corners of the feeder path 4 corresponding to the bevelled bottom edge 9 of the plug, that is the corners of the feeder path which are facing downwards in the "catch position" 6 thereof. The barrier ribs need not be longer than as to prevent incorrectly positioned plugs from passing the barrier and to be introduced into the feeder path, whereas the barrier ribs should allow correctly positioned plugs to pass. As a result the barrier ribs therefore are only shown provided along a short distance of the feeder path close to the funnel 16.

In case of handling of objects having another shape it is possible to use mechanical barriers which are shaped accordingly. For instance, as illustrated in FIGS. 9a and 2b, in case of handling objects 15 which are rotational symmetrical it is possible to guide such objects by forming the objects with a longitudinal slot 15a (FIG. 9b), and by forming the feeder path with a corresponding guide fin 26, which in such case extends along the entire feeder path as far as to the "catch position" 6.

Considering the cross section dimensions of the feeder path 4 and further considering the existence of the mechanical barrier 17 the plugs can not be introduced in the feeder path 4 unless they take the sole correct position, which is shown in FIG. 2, and which is the position in which the plug 15, at the lowermost end of the feeder path 4 is standing at the bottom thereof with the cavity 9 facing upwards to the handling arm 7. At this location the upper side of the feeder path 4 is formed with a bore 18 through which the catcher 10 can be introduced, whereby said catcher 10 engages the cavity 9 of the plug 2. By friction engagement, or by means of vacuum, the catcher 10 keeps the plug, and the plug can be lifted out of the feeder path 4 and can be moved to another position, as indicated with the arrow 19 of FIG. 1, in which case the blocker or plug 2 is pressed down into the mouth of the container 5. The objects (plugs) let down in the feeder path 4 place themselves on line after each other, in the direction upwards from the "catch position" 6, and as soon as a plug is lifted out from the path 4 the plugs upstrem thereof fill up the space, so that there is always a plug ready for being picked out through the bore 18 of the feeder path 4.

A problem in connection to introducing objects 2 in the feeder path 4 is that the objects may place themselves obliquely, or that they may meet the feeder path with the bottom surface or with the top surface thereof facing downwards, and in both said cases it is impossible to introduce the objects into the feeder path. In such case the incorrectly positioned objects may be placed as an obstacle in the way for the immediately succeeding, perhaps correctly positioned, objects, and for removing such obstacling objects the feeder path 4 is formed with a means 20 for introducing blasts of compressed air jets into the inner passageway 4a formed inside the feeder path 4. As best illustrated in FIG. 3 the introduction of compressed air is made through obliquely upwards extending bores 21 provided in one of the walls of of the feeder path, for instance in the right wall, as shown in FIG. 3, which is the wall forming the upper side of the feeder path in the "catch position" 6. As shown in FIG. 8, the air blast can also be directed through obliquely downwardly extending bores 21'. The blower means 20 is arranged to provide, at predermined intervals, a blast of compressed air obliquely upwards into the passageway 4a, whereby said blast of air lift eventually obliquely placed objects out of the passageway, and whereby said blast of air also provides an aeration and a whirling around of the objects 15 in the secondary container 14, thereby facilitating a re-arrangement and a re-orientaton of the objects and an introduction of "correctly" placed objects capable of moving past the mechanical barrier 17 and down through the passageway 4a of the feeder path 4.

For preventing objects already existing in the feeder path from being sucked out of the feeder passageway 4a when compressed air jets are introduced in the passageway the feeder path is formed with a stop means or a lock cylinder 22 provided slightly downstream of the blower means 20. The stop means 22 is arranged so that it can be moved into the feeder passageway 4a through a slot 23 of the feeder path 4 so as to prevent objects 2 existing downstream the stop means 22 from being sucked upwards in the passageway 4a. The stop means 22 is connected to the blower means 20 such that a) the stop means 22 is introduced in the passageway 4a and b) the blower means 20 is activated to issue a blast of compressed air jet in a predetermined sequence, and so that the stop means 10 is retracted from the passageway, according to the predetermined sequence, as soon as the blast of compressed air jet has ceased.

For efficient operation it is preferred that there are not too many objects in the secondary magazine container 14, since a large number of objects in the secondary container 14 might create such a heavy unit of objects that the objects can not be whirled around, as desired, when the blasts of compressed air are introduced in the passageway 4a. For feeding plugs 15 from the main container 11 through the pipe 13 to the secondary container 14 the main container 11 is pressurized, over a pressurizing connection 25, during a certain period of time. Since the main container 11 has only one outlet 13 such a pressurization with air makes plugs become whirled around and be moved into and pressed down through the pipe 13 to the secondary container 14 as indicated with the arrow 24. Alternatively it is possible to mechanically tilt the main container 11 over a certain angle thereby causing plugs to be introduced into the secondary container 14. Of course the main container 11 may be mounted spaced a longer distance from the secondary container 14 than as shown in FIG. 1, and in such case the pipe 13 is made correspondingly longer. Such tilting of the main container 11, and the manner which it can be accomplished, is illustrated in FIG. 9, which shows the tilted position of the main container in dashed lines. As is illustrated schematically, a tilting means 27 applies a force on main container 11 to cause tilting or pivoting thereof.

I claim:

1. A method of feeding objects from a magazine having set of said objects therein, through a feeder path to a catch position wherein the objects are disposed in a predetermined correct orientation, the objects being at least partly asymmetrical so that the objects can be positioned into the said predetermined orientation in the catch position, said method comprising the steps of:

feeding at least one object at a time down from a magazine through a feeding means to a feeder path having an inner passageway, providing a barrier at the inlet of the feeder path having a cross sectional shape and cross sectional size which, in cooperation with the inner passageway of the feeder path in which the barrier is arranged, presents a cross sectional size and cross sectional shape which substantially coincides with the cross sectional shape and cross sectional size of the object, permitting an object having a predetermined orientation to pass by said barrier and advance down into the passageway of the feeder path, temporarily lifting off objects at the inlet of the feeder path, including said barrier, which do not have said predetermined orientation using upwardly directed blasts of compressed air which are introduced obliquely upwards into the passageway from a position downstream of the barrier so that objects which do not have said predetermined orientation are blown out of the way to make space for objects having said predetermined orientation, intermittently preventing objects already released down into the passageway from becoming sucked back out of the passageway by said blasts of compressed air, piling objects above each other at the end of the feeder passageway with the lowermost object disposed in a position that permits removal of said lowermost object out of the passageway for continued handling thereof, and ceasing the preventing step at the same time as ceasing the use of said blasts of compressed air.

2. The method as claimed in claim 1 wherein said preventing step comprises intermittently introducing a stop means into said passageway.

3. The method as claimed in claim 1 wherein said preventing step comprises introducing a blast of compressed air in a downward direction downstream of said barrier from a location downstream of that at which said upwardly directed blasts are introduced.

4. The method according to claim 1 wherein the blasts of compressed air jets are introduced intermittently and are of such strength as to cause a whirling motion of the objects in the magazine.

5. The method according to claim 1, wherein said magazine comprises a main container which contains a plurality of the objects and a secondary container comprising a lesser plurality of the objects, said primary container communicating through a pipe with said secondary container which, in turn, is connected to the feeder path, said method further comprising the step of selectively pressurizing the main container by means of pressurized air of an intensity such that objects in the main container are cause to whirl around, and objects and air are moved down into the secondary container through said pipe.

6. The method as claimed in claim 1 wherein said magazine comprises a main container which contains a plurality of the objects and a secondary container comprising a lesser plurality of the objects, said primary container communicating through a pipe with said secondary container which, in turn, is connected to the feeder path, said method further comprising the step of selectively mechanically overturning the main container so that a desired number of objects are moved down into the secondary container.

7. Apparatus for feeding objects, which are at least partly asymmetrical, from a magazine containing a set of objects therein, through a feeder path to a catch position in which the objects are caused to assume a predetermined correct orientation, the objects are being positioned in said predetermined orientation at said catch position, said apparatus comprising:

a magazine containing objects which are at least partly asymmetrical, a funnel at the bottom of the magazine for conveying at least one object at a time into a feeder path, said feeder path being connected to said funnel, and said feeder path comprising a closed passageway having a cross sectional shape which is at least substantially rectangular, a barrier mounted at least close to the inlet of the feeder passageway, said barrier comprising means in the feeder passageway for providing that said passageway, together with the barrier, present a cross sectional shape and a cross sectional size which substantially coincides with the cross sectional shape and cross sectional size of an object when the object is in a correct predetermined orientation, such that only correctly oriented objects can pass said barrier and incorrectly oriented objects are prevented from passing said barrier, means for selectively introducing blasts of compressed air obliquely upwards into the feeder passageway from a location downstream of the barrier, and stop means, disposed downstream of said location for introducing the upwardly directed blasts of compressed air into the feeder passageway, for preventing objects already in said passageway from being sucked out of said passageway by said blasts of compressed air, said stop means being connected to the means for introducing said blasts of compressed air and being arranged such that said stop means is, according to a predetermined sequence, active when an upwardly directed blast of compressed air is introduced in the feeder passageway, and is, according to said sequence, inactive when the blast of compressed air ceases.

8. Apparatus as claimed in claim 7 wherein said stop means comprises a mechanical stop which is selectively introduced in said passageway.

9. Apparatus as claimed in claim 7 wherein said stop means comprises means for introducing a downwardly directed blast of compressed air into said passageway.

10. Apparatus according to claim 7 for handling of objects having an asymmetrical external shape, wherein said barrier comprises mechanical means fixedly mounted in the feeder path and having a shape corresponding to that of the objects to be handled.

11. Apparatus as claimed in claim 10 wherein said objects having a beveled bottom edge and said barrier comprises a pair of triangular ribs corresponding to the bevelled bottom edge of the objects and mounted adjacent corners of the feeder passageway.

12. Apparatus as claimed in claim 7 wherein the objects are cylindrical and are formed, at the bottom thereof, with a slot, and wherein the bottom of the feeder passageway is formed with a corresponding fin arranged to permit correctly positioned objects to enter into the passageway and to guide said objects along said passageway.

13. Apparatus according to claim 7, wherein said magazine comprises a main container containing a body of a plurality of objects to be handled therein, a secondary container having a lesser plurality of objects therein, and a communication pipe extending between the main container and the secondary container, said communication pipe having an upper end extending to a level above the body of objects in the main container, and said apparatus further comprising means for selectively pressurizing the inner of the main container so that air and objects are moved therefrom down into the secondary container through the communication pipe.

14. Apparatus as claimed in claim 7 wherein said magazine comprises a main container containing a body of a plurality of objects to be handled therein, a secondary container having a lesser plurality of objects therein, and a communication pipe extending between the main container and the secondary container, said communication pipe having an upper end extending to a level above the body of objects in the main container, and said apparatus further comprising means for selectively mechanically tilting the main container for letting objects down from the main container and into the secondary container through the communication pipe.

15. Apparatus according to claim 14, wherein the secondary container, at the bottom thereof, is formed to constitute said funnel for introducing at least one object at a time into the feeder passageway.

16. Apparatus according to claim 13, wherein said means introducing blasts of compressed air is arranged to provide blasts of compressed air of such strength as to blow off currently incorrectly positioned objects from the inlet of the feeder passageway, and so as to impart a whirling motion to objects in the secondary container.

17. Apparatus according to claim 14, wherein the secondary container, at the bottom thereof, is formed to constitute said funnel for introducing at least one object at a time into the feeder passageway.

18. Apparatus according to claim 14, wherein said means introducing blasts of compressed air is arranged to provide blasts of compressed air of such strength as to blow off currently incorrectly positioned objects from the inlet of the feeder passageway, and so as to impart a whirling motion to objects in the secondary container.

* * * * *